(12) United States Patent
Gyoda

(10) Patent No.: US 11,616,276 B2
(45) Date of Patent: Mar. 28, 2023

(54) BATTERY PACK

(71) Applicant: MAKITA CORPORATION, Anjo (JP)

(72) Inventor: Minoru Gyoda, Anjo (JP)

(73) Assignee: MAKITA CORPORATION, Anjo (JP)

( * ) Notice: Subject to any disclaimer, the term of this patent is extended or adjusted under 35 U.S.C. 154(b) by 83 days.

(21) Appl. No.: 17/205,079

(22) Filed: Mar. 18, 2021

(65) Prior Publication Data

US 2021/0305661 A1 Sep. 30, 2021

(30) Foreign Application Priority Data

Mar. 25, 2020 (JP) .............................. JP2020-054847

(51) Int. Cl.
| | |
|---|---|
| *H01M 50/519* | (2021.01) |
| *H01M 10/46* | (2006.01) |
| *H01M 10/655* | (2014.01) |
| *H01M 10/653* | (2014.01) |
| *H01M 50/522* | (2021.01) |
| *H01M 10/6235* | (2014.01) |
| *H01M 10/42* | (2006.01) |
| *H02J 7/00* | (2006.01) |

(52) U.S. Cl.
CPC ..... *H01M 50/519* (2021.01); *H01M 10/4257* (2013.01); *H01M 10/46* (2013.01); *H01M 10/6235* (2015.04); *H01M 10/653* (2015.04); *H01M 10/655* (2015.04); *H01M 50/522* (2021.01); *H01M 2010/4271* (2013.01); *H01M 2220/30* (2013.01); *H02J 7/0042* (2013.01); *H02J 7/0047* (2013.01)

(58) Field of Classification Search
CPC ............. H01M 50/519; H01M 50/522; H01M 10/6235; H01M 10/653; H01M 10/655; H01M 10/4257; H01M 10/46
See application file for complete search history.

(56) References Cited

U.S. PATENT DOCUMENTS

| | | | | |
|---|---|---|---|---|
| 2008/0030208 A1* | 2/2008 | Aratani | ............... | H01M 10/425 324/713 |
| 2014/0375231 A1 | 12/2014 | Suzuki et al. | | |
| 2018/0366697 A1* | 12/2018 | Elfering | .............. | H01M 50/509 |

FOREIGN PATENT DOCUMENTS

JP 6095502 B2 3/2017

* cited by examiner

*Primary Examiner* — Karie O'Neill Apicella
(74) *Attorney, Agent, or Firm* — J-Tek Law PLLC; Jeffrey D. Tekanic; Scott T. Wakeman

(57) ABSTRACT

A battery pack may include a battery (60), a board (10), a first connection terminal (12), a second connection terminal (11), a control circuit (620), and a busbar (18). The first connection terminal is provided on the board and is configured to be connected to an electric work machine (500). The second connection terminal is provided on the board and is connected to the battery. The control circuit is provided on the board and is configured to control discharging of the battery. The busbar is provided on the board in a current discharge path between the first connection terminal and the second connection terminal.

20 Claims, 8 Drawing Sheets

BATTERY PACK

CROSS-REFERENCE TO RELATED APPLICATION

The present application claims priority to Japanese patent application No. 2020-054847 filed on Mar. 25, 2020, the contents of which are hereby fully incorporated herein by reference.

TECHNICAL FIELD

The present disclosure relates to a battery pack, e.g., for usage with cordless power tools and outdoor power equipment.

BACKGROUND ART

US 2014/0375231 discloses a battery pack that comprises a multilayer board, on which a microcontroller, a discharge terminal, a charging terminal, a negative-electrode terminal, etc. are installed. By connecting the negative-electrode terminal to a negative-electrode of a battery cell using a multilayer semiconductor pattern, the current-carrying capacity of the above-mentioned battery pack can be increased.

SUMMARY OF THE INVENTION

When electric current flows through the negative-electrode terminal and the multilayer semiconductor pattern, the negative-electrode terminal and the multilayer semiconductor pattern generate heat. If the current-carrying capacity is increased, then the amount of heat generated by the negative-electrode terminal and the multilayer semiconductor pattern also increases. Because the negative-electrode terminal and the multilayer semiconductor pattern are installed on the same board that has heat-sensitive electronic components mounted thereon, such as the microcontroller, heat generated by the negative-electrode terminal and the multilayer semiconductor pattern is transmitted (conducted) to the heat-sensitive electronic components such as the microcontroller. If the current-carrying capacity is increased, then there is a possibility that the amount of heat transmitted to such electronic components will increase, and thereby such electronic components might be negatively affected (e.g., prematurely deteriorated and/or caused to malfunction) by the heat.

It is therefore one non-limiting object of the present disclosure to disclose techniques for curtailing the negative effects of heat generation on heat-sensitive electronic components disposed on a circuit board inside a battery pack.

In one aspect of the present disclosure, a battery pack comprises a battery, a board (e.g., a circuit board or substrate), a first connection terminal (e.g., a negative battery terminal), a second connection terminal (e.g., a positive battery terminal), a control circuit (e.g., a microcomputer or microprocessor), and a busbar. The first connection terminal is provided on the board and is configured to be connected to an electric work machine. The second connection terminal is provided on the board and is connected to the battery. The control circuit is provided on the board and is configured to control discharging (and optionally also charging) of the battery. The busbar is provided on the board in a current discharge path between the first connection terminal and the second connection terminal.

According to the above-mentioned aspect of the present disclosure, because the busbar is provided in the current discharge path between the first connection terminal and the second connection terminal, a discharge current flows through the busbar, and heat generated by the first connection terminal is transferred to the busbar. Compared with a conductive pattern (conductive tracks) printed on a printed circuit board, the busbar has a larger cross-sectional area and a smaller resistance value, and consequently the amount of heat generated due to the flow of the electric current between the first connection terminal and the second connection terminal is reduced. In addition, the busbar has a large conductor volume and has a higher heat-storage capability than that of conductive pattern (conductive tracks). Moreover, by installing the busbar to connect the first connection terminal, e.g., to the battery, the conductive pattern can be omitted in the current discharge path between the first connection terminal and the battery, and therefore the conduction of heat from a heat-generating component to heat-sensitive electronic components on the board can be curtailed. Accordingly, by providing the busbar in the current discharge path (instead of a conductive pattern or track), the amount of heat transferred to heat-sensitive electronic components, such as the control circuit, can be reduced, and thereby the effect of heat on such electronic components, such as the control circuit, can be curtailed. In addition, the strength or rigidity of the busbar may be greater than the strength or rigidity of the board. In such embodiments, by providing the busbar on the board, flexure of the board can be curtailed, and the structure of the board can be strengthened (reinforced).

In addition, the battery pack may further comprise a device, which has a resistance component (such as a shunt resistor) and is provided in the current discharge path on the board. The heat generated by the device, which has a resistance component, due to the flow of the discharge current is transferred to the busbar and dissipated from the busbar. Thereby, the transfer of the heat generated by the device having a resistance component to the heat-sensitive electronic components, such as the control circuit, can be suitably curtailed.

In addition, the busbar may comprise a plurality of standing parts or projections that each extend or project perpendicularly (or substantially perpendicularly) away from the board, and a non-contacting part, which connects the standing parts and is spaced apart from the board by a gap (preferably, an air gap). If the non-contacting part of the busbar does not contact the board, then the transfer (conduction) of heat from the busbar to the control circuit, etc. can be further curtailed.

In addition, the busbar may comprise a shunt resistor. If the busbar comprises the shunt resistor, the number of parts on the board can be reduced. In turn, the size of the board can be reduced.

In addition, the battery pack may comprise a case and a thermally conductive pad (heat-dissipating sheet). The case houses the battery and the board. The thermally conductive pad is provided such that it makes contact with an inner surface of the case and a surface of the busbar. By providing the thermally conductive pad, the dissipation of heat away from the busbar can be promoted while the propagation of any impact applied to the case to the board can be curtailed.

DETAILED DESCRIPTION OF EMBODIMENTS OF THE INVENTION

Embodiments (modes) for carrying out aspects of the present teachings are explained below, with reference to the drawings.

<1. Configuration of Battery System>

Figure 1:
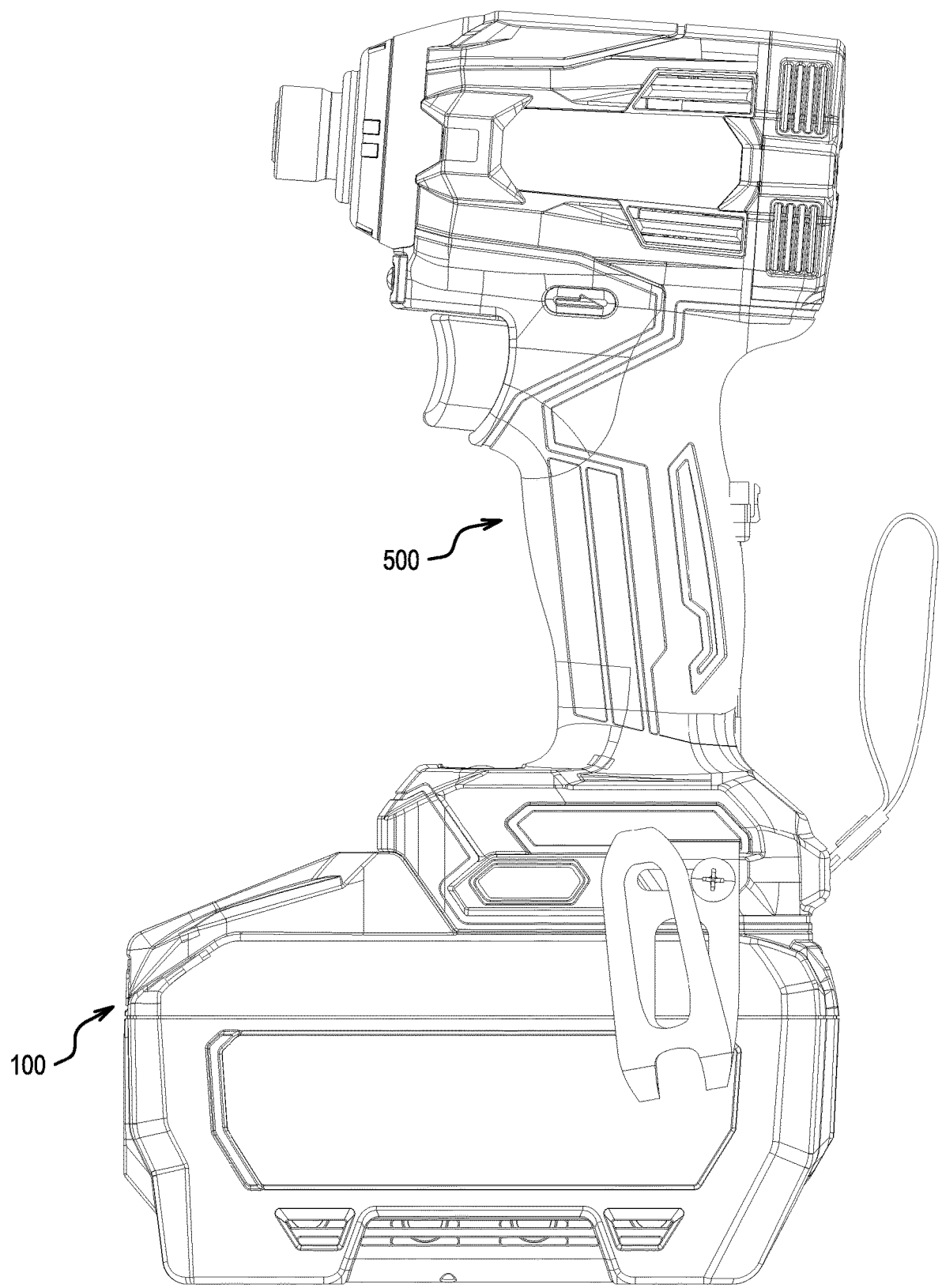
FIG. 1 is a side view of a battery system, which comprises a battery pack and an electric work machine, according to a first embodiment of the present teachings.
Figure 2:
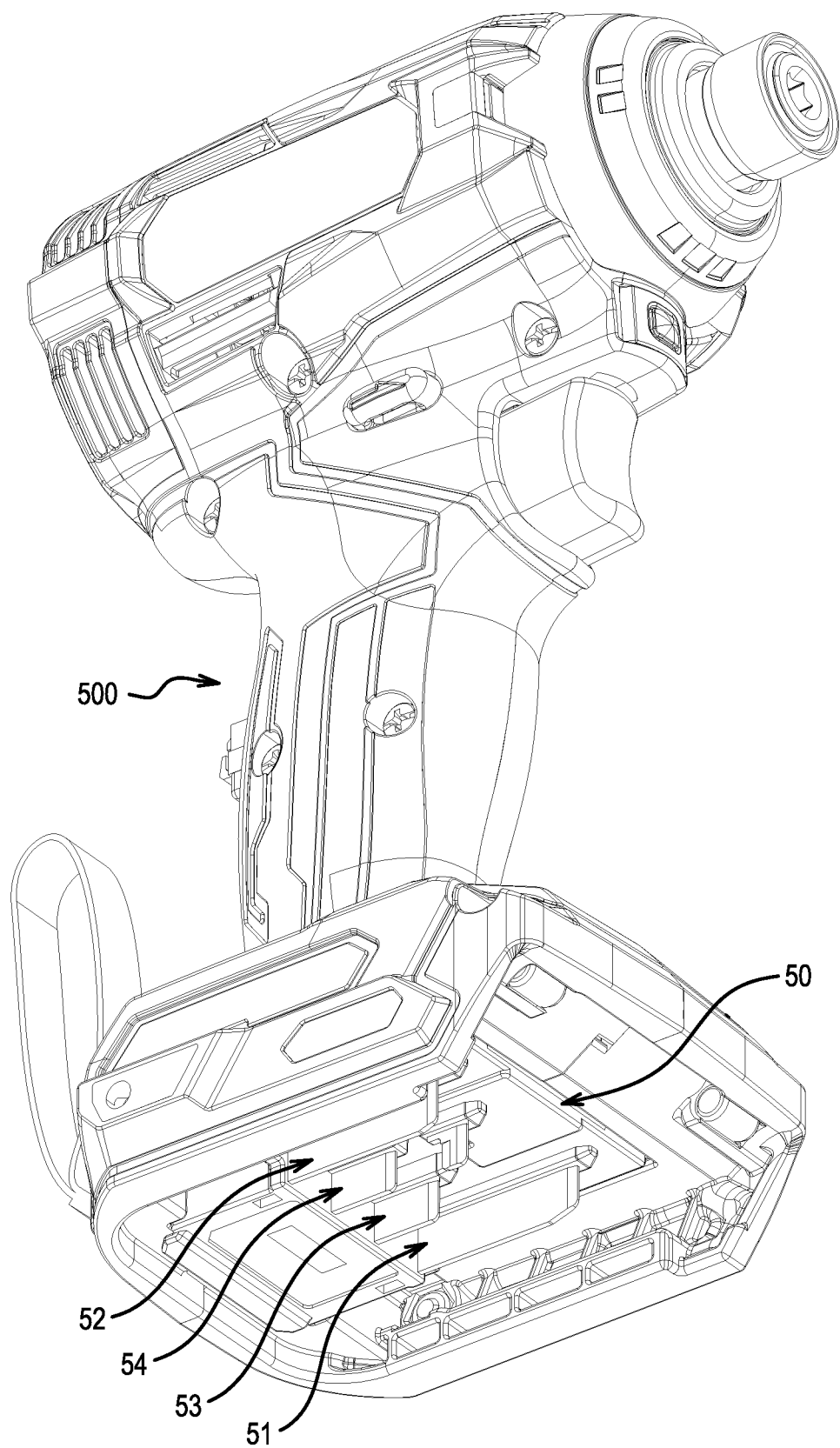
FIG. 2 is an oblique view of a work-machine connection part of the electric work machine according to the first embodiment.
Figure 3:
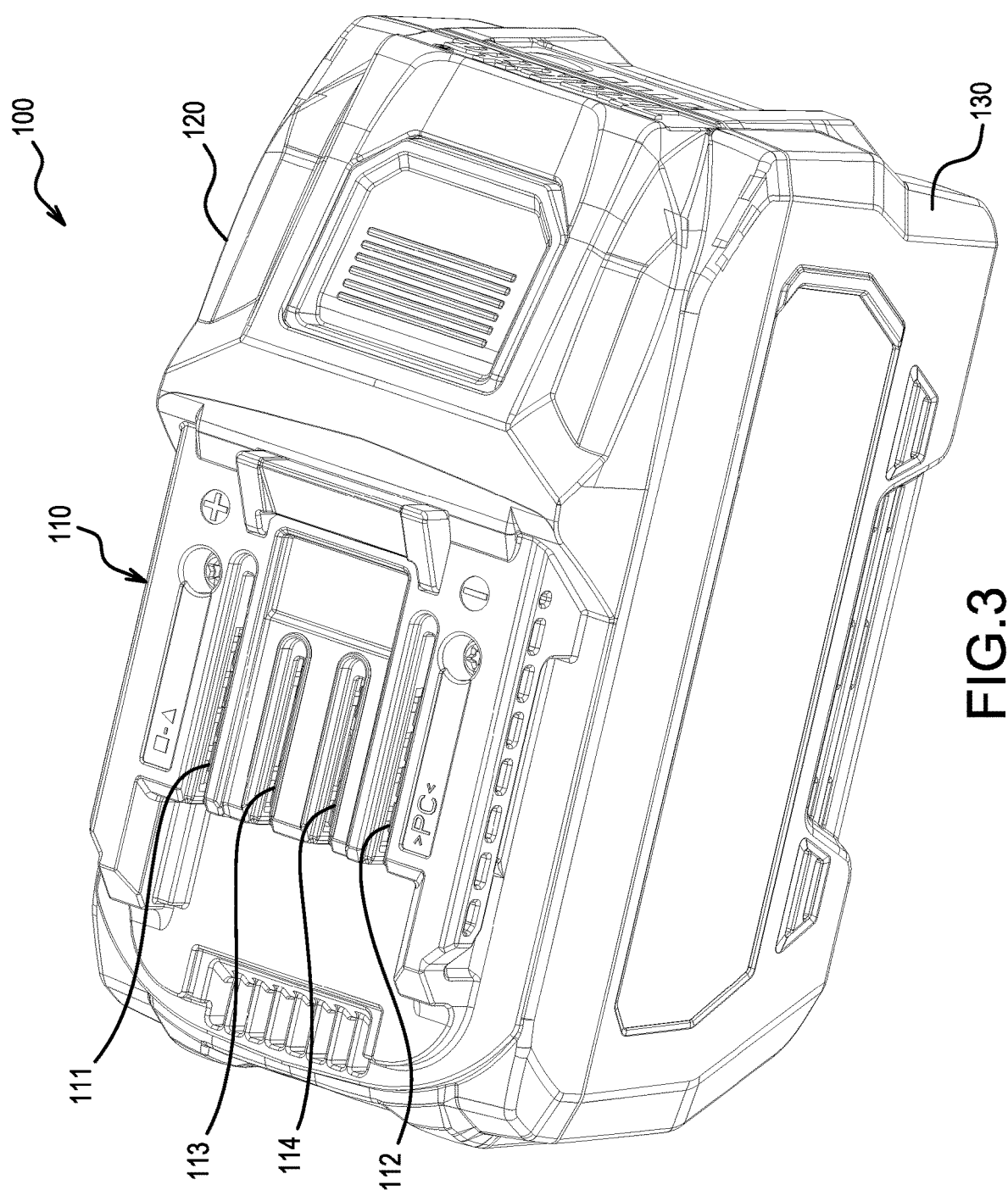
FIG. 3 is an oblique view of a battery-connection part of the battery pack according to the first embodiment.

First, the configuration of a battery system according to a first representative, non-limiting embodiment of the present teachings will be explained, with reference to FIGS. 1-3. The battery system according to the present (first) embodiment comprises a battery pack (battery cartridge) 100 and an electric work machine 500, such as a power tool or outdoor power equipment. The battery pack 100 supplies electric power (current) to the electric work machine 500. The electric work machine 500 becomes operable upon being connected to a supply of electric power (current) from the battery pack 100.

In the present embodiment, the electric work machine 500 is an impact driver, but electric work machines 500 according to the present teachings are not limited to an impact driver. That is, the type of electric work machine 500 is not particularly limited as long as the electric work machine is operable (driven) with electric power (current) from the battery pack 100. For example and without limitation, the present teachings are applicable to other types of power tools (e.g., cordless power tools), such as hammer drills, rotary hammers, electric saws, multi-tools, grinders, sanders, etc.; gardening tools and other types of outdoor power equipment, such as mowers, hedge trimmers, chain saws, string trimmers, blowers, etc.; laser devices; lighting (e.g., flashlights, spot lights, flood lights, work lights, etc.); coffee makers; or the like.

The electric work machine 500 of the first embodiment comprises a work-machine connection part (battery mount part) 50, which is disposed under a grip (handle) that is designed to be grasped by the user and to which the battery pack 100 is connected. However, the location of the work-machine connection part (battery mount part) is not particularly limited in the present teachings. As shown in FIG. 2, the work-machine connection part 50 comprises four terminals, which protrude toward the battery pack 100 from an oblong-shaped connection surface. Each of the four terminals is made of metal, has a plate shape, and extends in a longitudinal direction of the work-machine connection part 50. Specifically, the work-machine connection part 50 comprises a work-machine, positive-electrode terminal 51, a work-machine first communication terminal 53, a work-machine second communication terminal 54, and a work-machine, negative-electrode terminal 52. The work-machine, positive-electrode terminal 51, the work-machine first communication terminal 53, the work-machine second communication terminal 54, and the work-machine, negative-electrode terminal 52 are disposed such that they are lined up (aligned or parallel) in order in a latitudinal direction of the work-machine connection part 50. The work-machine, positive-electrode terminal 51 and the work-machine, negative-electrode terminal 52 are each longer than the work-machine first communication terminal 53 and the work-machine second communication terminal 54.

The battery pack 100 comprises an upper case (shell) 120 and a lower case (shell) 130. The upper case 120 has a tray shape with an open lower surface. The lower case 130 has an oblong shape and an open upper surface. A single (integral) case is formed by combining (joining) the upper case 120 and the lower case 130 such that the upper case 120 covers the open upper surface of the lower case 130. A board (circuit board or substrate) 10, which is described below, and a battery (at least one battery cell) 60 are housed in the interior of the upper case 120 and the lower case 130.

The upper case 120 comprises a battery-connection part (terminal block and slide rails) 110, which is disposed on an upper surface of the upper case 120 and is designed to be physically and electrically connected to the work-machine connection part 50. As shown in FIG. 3, the battery-connection part 110 has four insertion openings, into which the four terminals of the work-machine connection part 50 are respectively inserted. The four insertion openings extend in the longitudinal direction of the upper case 120. Specifically, the battery-connection part 110 comprises, in order from left to right, a first insertion opening 111, a third insertion opening 113, a fourth insertion opening 114, and a second insertion opening 112. The first insertion opening 111, the third insertion opening 113, the fourth insertion opening 114, and the second insertion opening 112 are disposed such that they are lined up (aligned or parallel) in order in the latitudinal direction of the upper case 120.

A battery positive terminal 11, which is made of metal and is described below, is disposed in the first insertion opening 111; the work-machine, positive-electrode terminal 51 is inserted into the first insertion opening 111. A battery negative terminal 12, which is made of metal and is described below, is disposed in the second insertion opening 112; the work-machine, negative-electrode terminal 52 is inserted into the second insertion opening 112. A charging terminal 13 and a first communication terminal 14, which are made of metal and are described below, are disposed in the third insertion opening 113; the work-machine first communication terminal 53 is inserted into the third insertion opening 113. A serial-communication terminal 15 and a second communication terminal 16, which are made of metal and are described below, are disposed in the fourth insertion opening 114; the work-machine second communication terminal 54 is inserted into the fourth insertion opening 114.

By sliding the electric work machine 500 relative to the battery pack 100 in the state in which the work-machine connection part 50 and the battery-connection part 110 are positioned to oppose (face) one another, the work-machine connection part 50 is physically and electrically connected to the battery-connection part 110. Thereby, the work-machine, positive-electrode terminal 51 is connected to the battery positive terminal 11, and the work-machine, negative-electrode terminal 52 is connected to the battery negative terminal 12. In addition, the work-machine first communication terminal 53 is connected to the first communication terminal 14, and the work-machine second communication terminal 54 is connected to the second communication terminal 16. In turn, it becomes possible to supply electric power (current) from the battery pack 100 to the electric work machine 500, and communication between the battery pack 100 and the electric work machine 500 also becomes possible. In this state, when the user pulls a trigger switch of the electric work machine 500, the electric work machine 500 operates.

<2. Board of Battery Pack>
<2-1. Overall Configuration of Board>

Figure 4:
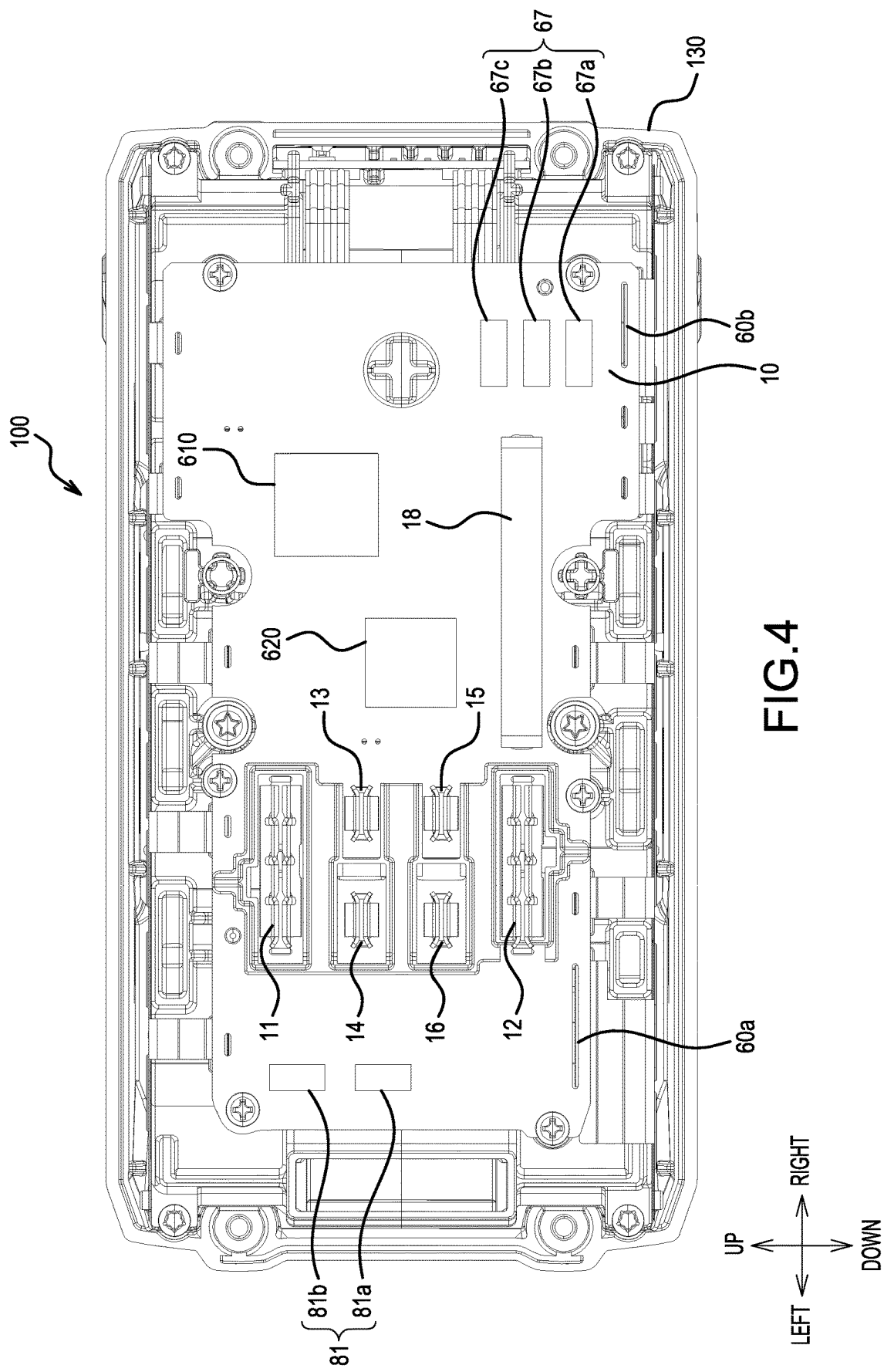
FIG. 4 is a plan view of the first embodiment, in which an upper case of the battery pack has been removed.
Figure 5:
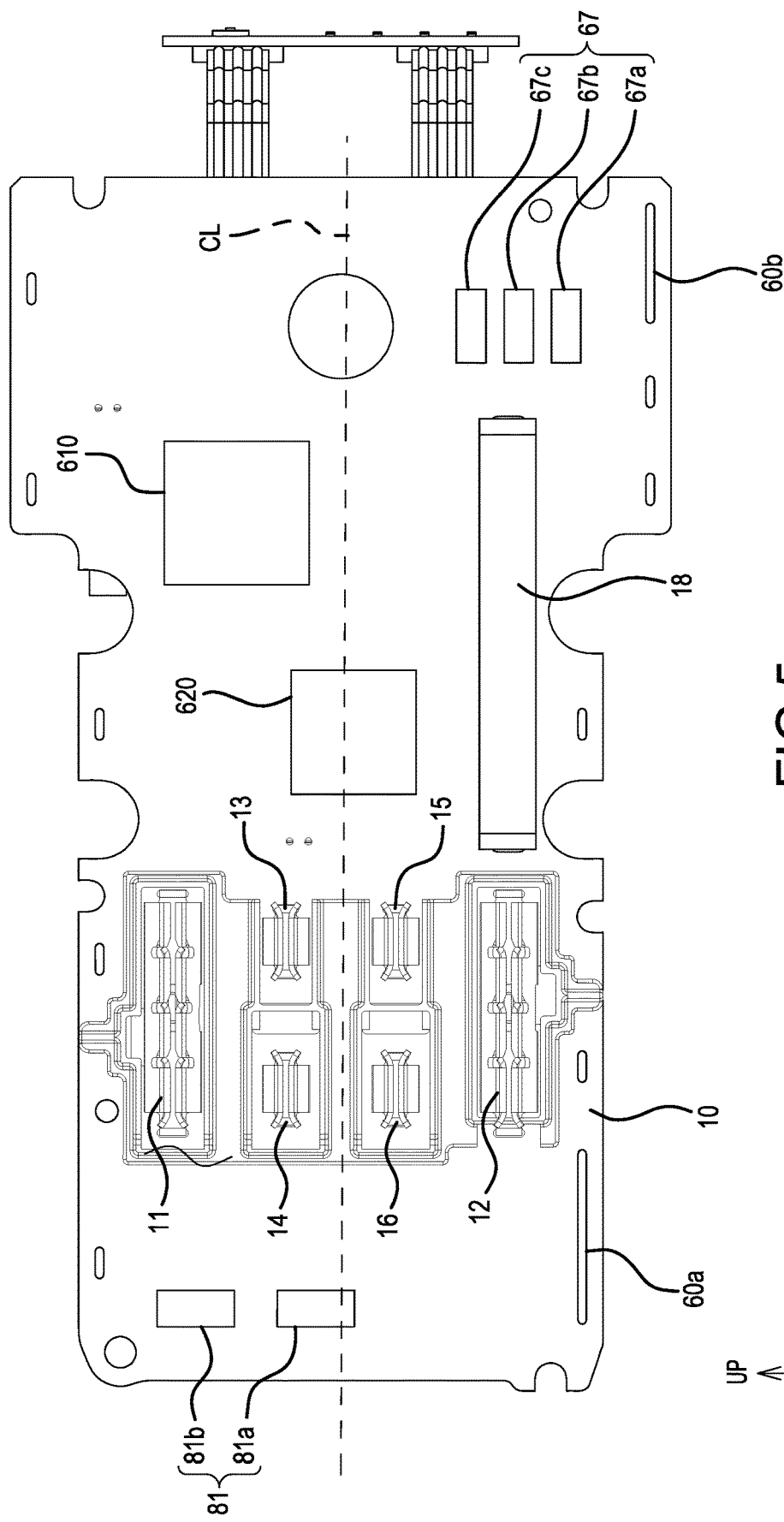
FIG. 5 is a plan view of a board of the battery pack according to the first embodiment.
Figure 6:
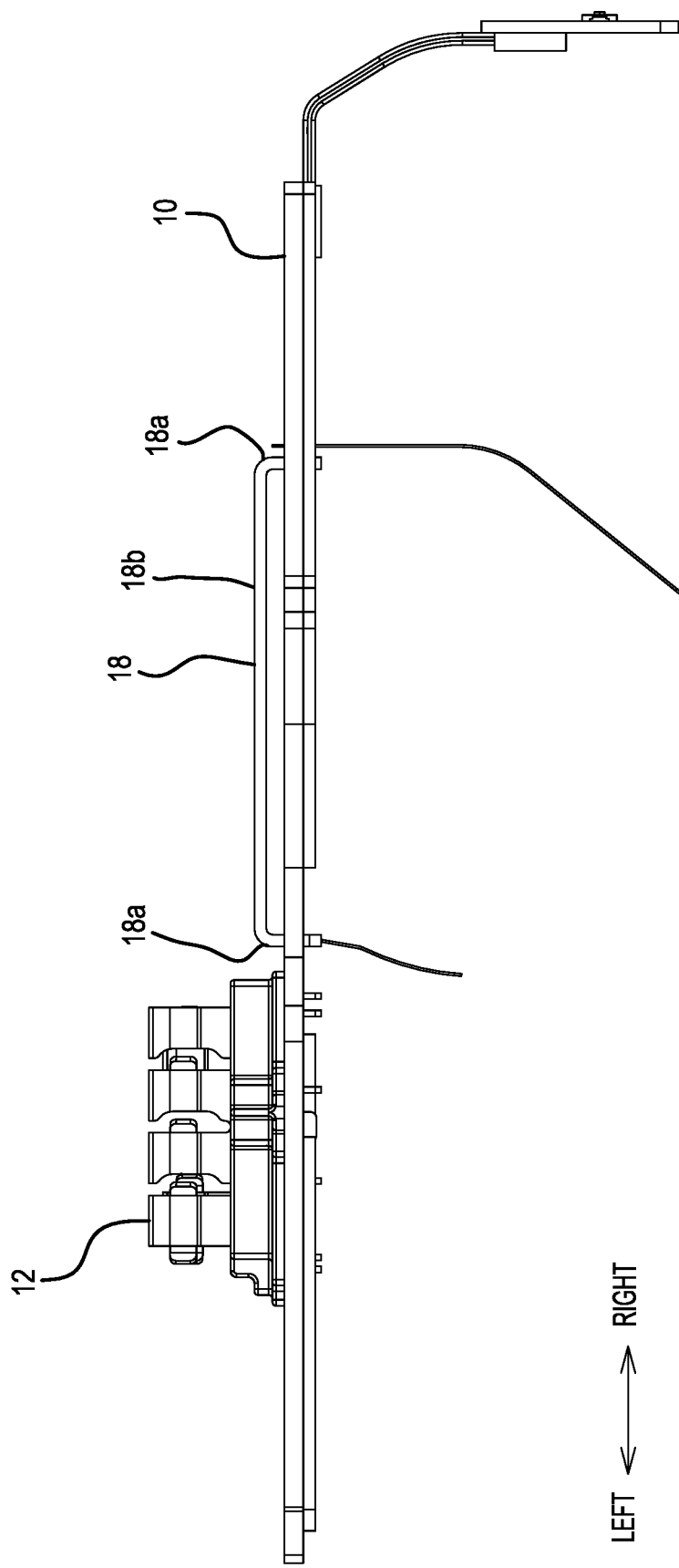
FIG. 6 is a side view of the board of the battery pack according to the first embodiment.
Figure 7:
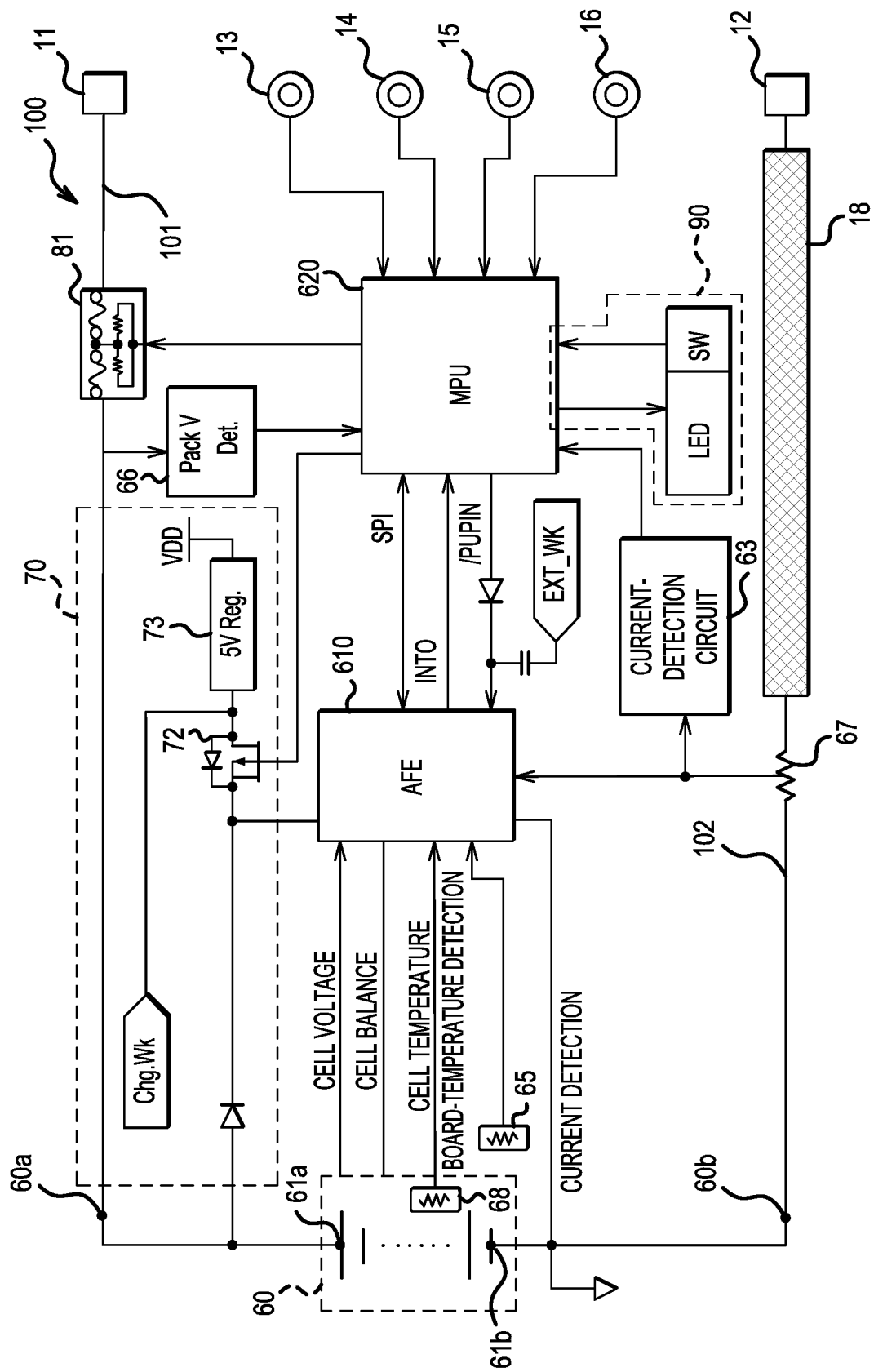
FIG. 7 is a circuit diagram of the battery pack according to the first embodiment.

Next, the overall configuration of the board 10 of the battery pack 100 will be explained, with reference to FIG. 4 to FIG. 7. FIG. 4 shows the state in which the upper case 120 has been removed from the battery pack 100. FIG. 5 and FIG. 6 show the board 10 removed from the battery pack 100. FIG. 7 shows the circuit configuration (circuit diagram) of the battery pack 100.

As shown in FIG. 4, the board 10 is disposed downward of the upper case 120 of the battery pack 100. Furthermore, the battery 60 is housed in a space between the board 10 and the lower case 130. The battery 60 comprises, e.g., a plurality of series-connected battery cells, for example, lithium-ion batteries, and is capable of discharging and charging; i.e. it is a rechargeable or secondary battery.

The board 10 is a printed circuit board that has an oblong shape. As shown in FIG. 4 and FIG. 5, the battery positive terminal 11, the battery negative terminal 12, the charging terminal 13, the first communication terminal 14, the serial-communication terminal 15, the second communication terminal 16, an analog front end (hereinbelow, AFE) 610, a microprocessor unit (hereinbelow, MPU) 620, a self-control protector (hereinbelow, SCP) circuit 81, a shunt resistor 67, and a busbar 18 are installed on the board 10. Furthermore, as shown in FIG. 7, a current-detection circuit 63, a battery pack-voltage detecting part 66, a power-supply circuit 70, and a sub-printed-circuit-board control part (hereinbelow, sub-PCB control part) 90 are installed on the board 10. In addition, a positive-electrode tab 60a and a negative-electrode tab 60b are provided on the board 10.

When a charger is electrically connected to the battery pack 100, the charging terminal 13 outputs a charging-permitted signal or a charging-prohibited signal to the charger depending on the state of the battery 60. The charging-permitted signal is a signal that permits charging of the battery 60. The charging-prohibited signal is a signal that prohibits charging of the battery 60. When the electric work machine 500 is electrically connected to the battery pack 100, trigger-switch information is input from the electric work machine 500 to the first communication terminal 14. The trigger-switch information is information that indicates whether the trigger switch of the electric work machine 500 is ON or OFF. The serial-communication terminal 15 is designed to perform serial communication with a charger while the charger is electrically connected to the battery pack 100.

When the electric work machine 500 is electrically connected to the battery pack 100, the second communication terminal 16 outputs a discharging-permitted signal or a discharging-prohibited signal to the electric work machine 500 depending on the state(s) of the battery pack 100 and/or the electric work machine 500. The discharging-permitted signal is a signal that permits discharging of the battery 60. The discharging-prohibited signal is a signal that prohibits discharging of the battery 60. In addition, when a charger is electrically connected to the battery pack 100 at the time that the MPU 620 is shut down or in a sleep mode, an auxiliary power supply (current) is input from the charger to the second communication terminal 16 so that power is not drawn from the battery 60 while the battery pack 100 is mounted on the charger.

As shown in FIG. 7, the battery positive terminal 11 is connected to the positive-electrode tab 60a via a positive-electrode line 101. The positive-electrode tab 60a is connected to a positive electrode 61a of the battery 60. In addition, the battery negative terminal 12 is connected to the negative-electrode tab 60b via a negative-electrode line 102. The negative-electrode tab 60b is connected to a negative electrode 61b of the battery 60.

The MPU 620 comprises a microcomputer, which comprises a CPU, ROM, RAM, I/O, etc., and performs various types of control, including discharging control and charging control of the battery 60. The MPU 620 acquires the trigger-switch information of the electric work machine 500 via the second communication terminal 16. In the situation in which information that the trigger switch is ON has been acquired, the MPU 620 wakes up; on the other hand, in the situation in which information that the trigger switch is OFF has been acquired, the MPU 620 transitions to a sleep mode when a prescribed condition has been satisfied.

The AFE 610 is an analog circuit and is configured to perform at least one of the detections and processes in (1)-(6) below.

(1) In accordance with an instruction from the MPU 620, detect the cell voltage of each battery cell included in the battery 60.

(2) Detect the cell temperature of at least one battery cell using a thermistor 68.

(3) Perform a cell-balancing process, which equalizes the remaining charge capacities of the plurality of battery cells.

(4) Detect the board temperature using a thermistor 65.

(5) Detect the charging current, which flows into the battery 60, using the shunt resistor 67, and the discharge current, which flows out of the battery 60, using the shunt resistor 67.

(6) Convert the detection values of the detected cell voltage, cell temperature, board temperature, and charging/discharge current into digital signals and output those digital signals to the MPU 620.

The MPU 620 determines the state of the battery 60 based on the various inputted signals. Furthermore, the MPU 620 determines whether to permit or prohibit the charging of the battery 60 based on the determined state of the battery 60, generates a charging-permitted signal or a charging-prohibited signal, and outputs the appropriate signal to the charging terminal 13. In addition, the MPU 620 determines whether to permit or prohibit discharging of the battery 60 based on the determined state of the battery 60, generates a discharging-permitted signal or a discharging-prohibited signal, and outputs the appropriate signal to the second communication terminal 16.

The current-detection circuit 63 detects the electric current that flows into and out of the battery 60 via the shunt resistor 67. The battery pack-voltage detecting part 66 detects the battery pack voltage, which is the voltage across the two (plus and minus) terminals 11, 12 of the battery 60, and outputs the detected battery pack voltage to the MPU 620. The MPU 620 determines whether the battery pack voltage detected by the battery pack-voltage detecting part 66 coincides with (is equal to) the total of the cell voltages detected by the AFE 610.

The power-supply circuit 70 comprises a switch 72 and a voltage regulator 73. When the MPU 620 is shutting down or is shut down, the voltage regulator 73 generates a power-supply voltage VDD, which is for driving internal circuitry, by receiving auxiliary electric power (current) from the charger via the second communication terminal 16. When the battery pack 100 enters an over-discharged state, the MPU 620 executes a program to shut down (disable further discharge of) the battery pack 100. When the MPU 620 receives the supply of the power-supply voltage VDD generated by the voltage regulator 73, the MPU 620 starts up from the shutdown state and outputs, to the charger, a charging-permitted signal, as long as the battery is in a rechargeable state. When the battery voltage reaches the prescribed voltage, the switch 72 is turned ON. When the switch 72 is turned ON, the voltage regulator 73 generates the power-supply voltage VDD by using the electric power (current) received from the battery 60.

The sub-PCB control part 90 comprises LEDs and a switch. When the MPU 620 detects that the switch has been pressed, the MPU 620 turns ON (illuminates) one or more LEDs in accordance with the detected remaining charge capacity of the battery; i.e. the greater the remaining charge capacity, the greater the number of LEDs that is turned on. The remaining charge capacity of the battery may be calculated based on the battery voltage or the integrated electric current, or based on both.

The SCP circuit 81 comprises two circuits, a first SCP circuit 81*a* and a second SCP circuit 81*b*, and is provided along (in series with) the positive-electrode line 101. The first SCP circuit 81*a* comprises a resistor and a fuse. The second SCP circuit 81*b* is configured in the same manner as the first SCP circuit 81*a*. The SCP circuit 81 may comprise only one of the first SCP circuit 81*a* and the second SCP circuit 81*b* or may comprise three or more of the SCP circuits.

In the situation in which charging does not stop even though a charging-prohibited signal is being output, and in the situation in which discharging does not stop even though a discharging-prohibited signal is being output from the battery pack 100, to ensure safety, the MPU 620 causes the fuses to blow by supplying electric current to the resistors of the first SCP circuit 81*a* and the second SCP circuit 81*b*. Thereby, the positive-electrode line 101 is broken (interrupted or opened), so that the battery 60 enters a non-chargeable and non-dischargeable state. That is, the battery 60 enters a non-reusable state. The SCP circuit 81 is a circuit for doubly ensuring safety with respect to the overcharged state and the over-discharged state of the battery 60.

The busbar 18 and the shunt resistor 67 are provided along (in series with) the negative-electrode line 102. The shunt resistor 67 comprises a first resistor 67*a*, a second resistor 67*b*, and a third resistor 67*c*. The first resistor 67*a*, the second resistor 67*b*, and the third resistor 67*c* are connected in parallel to one another. That is, in the present first embodiment, the charging current and the discharge current flow to the three resistors 67*a*, 67*b*, 67*c*, divided thereamong, and are detected by the current-detection circuit 63. The shunt resistor 67 may comprise one resistor, two resistors connected in parallel, or four or more resistors connected in parallel.

<2-2. Arrangement of Components on the Board>

Next, the arrangement of the principal components on the board 10 will be explained. Hereinbelow, up and down in the paper plane of FIG. 4 is referred to as the up-down direction, and left and right in the paper plane is referred to as the left-right direction. The board 10 is configured such that the width of its right-end portion is greater than the width on its left side. The electric work machine 500 is mounted on the battery pack 100 by sliding the electric work machine 500 from left to right.

The positive-electrode tab 60*a* is provided on the left end of the lower end of the board 10. The negative-electrode tab 60*b* is provided on the right end of the lower end of the board 10.

The first SCP circuit 81*a* and the second SCP circuit 81*b*, which are included in the SCP circuit 81, are provided on an upper portion of the left end of the board 10. The first SCP circuit 81*a* and the second SCP circuit 81*b* are disposed lined up in the up-down direction.

The battery positive terminal 11, the battery negative terminal 12, the charging terminal 13, the first communication terminal 14, the serial-communication terminal 15, and the second communication terminal 16 are provided, lined up (aligned, parallel) in the up-down direction, rightward of the positive-electrode tab 60*a*.

Specifically, the battery positive terminal 11 is provided, extending in the left-right direction, on the upper end of the board 10. The charging terminal 13 and the first communication terminal 14 are provided, lined up (aligned, parallel) left and right, below the battery positive terminal 11. The charging terminal 13 is provided on the right side, and the first communication terminal 14 is provided on the left side. The serial-communication terminal 15 and the second communication terminal 16 are provided, lined up (aligned, parallel) in the left-right direction, below the charging terminal 13 and the first communication terminal 14. The serial-communication terminal 15 is provided on the left side, and the second communication terminal 16 is provided on the right side. The battery negative terminal 12 is below the serial-communication terminal 15 and the second communication terminal 16 and is provided, extending in the left-right direction, on the lower end of the board 10.

The first resistor 67*a*, the second resistor 67*b*, and the third resistor 67*c*, which are included in the shunt resistor 67, are provided, lined up (aligned, parallel) in the up-down direction, upward of the negative-electrode tab 60*b* on a right portion of the board 10.

The busbar 18 is provided between (in series with) the battery negative terminal 12 and the shunt resistor 67. As shown in FIG. 6, the busbar 18 comprises two standing parts (projections) 18*a* and a non-contacting part 18*b*. Each of the standing parts 18*a* stands up (projects, extends) from the board 10 in a direction perpendicular to the plane of the board 10. A first end of each of the standing parts 18*a* is soldered to the board 10. One of the two standing parts 18*a* is disposed nearer to the battery negative terminal 12. The other of the two standing parts 18*a* is disposed nearer to the shunt resistor 67.

The non-contacting part 18*b* connects second ends of the two standing parts 18*a* and extends in the left-right direction of the board 10. In greater detail, the non-contacting part 18*b* is disposed such that its extension direction is parallel to the plane (lower side) of the board 10. The non-contacting part 18*b* is suspended above the board 10 and does not make contact with the board 10. That is, a first gap (e.g., an air gap), which corresponds to the length of the standing parts 18*a* in the up-down direction and the distance between the standing parts 18*a* in the left-right direction, is provided (defined) between the non-contacting part 18*b* and the board 10. The length of the standing parts 18*a* is set such that, when the board 10 is covered by the upper case 120, a second gap (e.g., another air gap) is provided between the non-contacting part 18*b* and the upper case 120. By providing the second gap between the non-contacting part 18*b* and the upper case 120, if the upper case 120 were to make contact with an object (e.g., because the battery pack is dropped onto the floor), the transmission of impact energy (shock) to the non-contacting part 18b and, in turn, to the board 10 is curtailed.

The MPU 620 is provided spaced apart by a prescribed distance from and rightward of the charging terminal 13 and the serial-communication terminal 15; the MPU 620 is provided spaced apart by a prescribed distance from and upward of the busbar 18. The AFE 610 is provided spaced apart by a prescribed distance from and rightward of the MPU 620 and is provided spaced apart by a prescribed distance from and upward of the busbar 18.

In addition, in the left-right direction, the MPU 620 and the AFE 610 are disposed between a left-end portion and a right-end portion of the non-contacting part 18b. That is, the left-end portion of the MPU 620 is disposed rightward of the left-end portion of the non-contacting part 18b. The right-end portion of the AFE 610 is disposed leftward of the right-end portion of the non-contacting part 18b.

Furthermore, as shown in FIG. 5, the MPU 620 is disposed in the up-down direction such that it spans a centerline CL. The AFE 610 is disposed upward of the centerline CL, and the busbar 18 is disposed downward of the centerline CL. The centerline CL is a line that passes through the center of the board 10 in the up-down direction.

When the work-machine connection part 50 has been connected to the battery-connection part 110, a discharge current can flow from the positive-electrode tab 60a to the battery positive terminal 11 via the SCP circuit 81. Furthermore, the discharge current can flow from the battery positive terminal 11 to the battery negative terminal 12 via the electric work machine 500. Furthermore, the discharge current can flow from the battery negative terminal 12 to the negative-electrode tab 60b via the busbar 18 and the shunt resistor 67.

When electric current flows to a device that has a resistance component (hereinbelow referred to as a heat-generating device), the device generates heat. In particular, because the value (in amperes) of the discharge current is larger than the value (in amperes) of the charging current by one or more orders of magnitude, the amount of heat generated by the device while the battery 60 is discharging is larger than while the battery 60 is charging. With regard to the components on the board 10, the battery positive terminal 11, the battery negative terminal 12, the SCP circuit 81, the shunt resistor 67, and the busbar 18 correspond to the heat-generating devices.

A fan for cooling the motor, controller, etc. is often provided in the interior of electric work machines. Consequently, in electric work machines, there is a relatively low possibility that heat generated by heat-generating devices will negatively affect heat-sensitive electronic components, such as the control circuit, because the fan can adequately cool the heat-generating components during operation of the electric work machine.

In contrast, in the battery pack 100, heat-generating devices are installed on the same board 10 as the MPU 620 and the AFE 610. In addition, to reduce the size of the battery pack 100, a fan for cooling is not provided in the interior of the battery pack 100. Consequently, the MPU 620 and the AFE 610 on the board 10 are prone to be affected by heat generated by the heat-generating devices. If the temperature of the MPU 620 and the AFE 610 (which are heat-sensitive components) were to exceed a permissible-temperature value, then there is a possibility that a problem (e.g., a malfunction) will occur in the operation of the MPU 620 and the AFE 610.

The MPU 620 and the AFE 610 in particular are negatively affected by heat from heat-generating devices disposed near the MPU 620 and the AFE 610. In the present first embodiment, one such heat-generating device, which is disposed near the MPU 620 and the AFE 610, is wiring that connects the battery negative terminal 12 and the shunt resistor 67.

In conventional battery packs, a copper pattern (conductive track) electrically connects the battery negative terminal to other electrical components and/or the battery cell(s) in the battery pack. Because the copper pattern is thin and has a relatively small cross-sectional area, the resistance component is comparatively large and the amount of heat generated by such a copper pattern is comparatively large. Consequently, if the above-mentioned wiring is configured as a conductive pattern (specifically, a copper pattern), the amount of heat generated at (by) the battery negative terminal 12, the shunt resistor 67, and the copper pattern becomes comparatively large.

Furthermore, because the copper pattern has a comparatively high thermal conductivity, it tends to be affected by the heat generated at (by) the battery negative terminal 12 and the shunt resistor 67. Consequently, if the wiring of the copper pattern is disposed near the MPU 620 and the AFE 610, then a comparatively large amount of heat generated at (by) the battery negative terminal 12, the shunt resistor 67, and the copper pattern is transferred (conducted) from the copper pattern to the MPU 620 and the AFE 610, with hardly any of the heat being dissipated prior to reaching the MPU 620 and the AFE 610. As a result, the amount of heat transferred to the MPU 620 and the AFE 610 may be relatively large in embodiments that use copper pattern to electrically connect the battery negative terminal 12 with the battery 60.

In contrast, in the present first embodiment, the battery negative terminal 12 is connected to the shunt resistor 67 via the busbar 18. Furthermore, the busbar 18 may be disposed near the MPU 620 and the AFE 610. However, compared with copper pattern, the busbar 18 is thicker and has a larger cross-sectional area and consequently has a comparatively smaller resistance component and generates a comparatively smaller amount of heat.

Furthermore, owing to the installation of the busbar 18, copper pattern between the battery negative terminal 12 and the shunt resistor 67 can be omitted in embodiments of the present teachings, and thereby the transfer of the heat (generated at (by) the battery negative terminal 12, the shunt resistor 67, etc.) to the MPU 620 and the AFE 610 can be curtailed in case no copper pattern is utilized to connect the battery negative terminal 12 with the shunt resistor 67. In addition, the first (air) gap is provided between the non-contacting part 18b of the busbar 18 and the board 10, such that the non-contacting part 18b does not contact the board 10. Consequently, the heat-conduction distance from the busbar 18 to the MPU 620 and the AFE 610 is longer than in an embodiment in which the entire busbar 18 makes contact with the board 10. Therefore, an air insulating layer reduces the transfer (conduction) of heat from the busbar 18 to the MPU 620 and the AFE 610, contrary to an embodiment in which the entire busbar 18 makes contact with the board 10.

Consequently, in the present first embodiment, the effect of the generation of heat by conductive pattern can be curtailed, and the transfer of the heat generated by (at) the battery negative terminal 12 and the shunt resistor 67 to the MPU 620 and the AFE 610 can be curtailed.

In addition, the busbar 18 is composed of a metal member whose strength is greater than that of the board 10; also, the busbar 18 extends in the longitudinal direction of the board 10. Consequently, owing to the installation of the busbar 18, flexure of the board 10 is curtailed, and the structure of the board 10 is strengthened (reinforced).

In addition, the busbar 18 may be configured integrally with and may have the same plate thickness as the shunt resistor 67. That is, the busbar 18 may be designed such that it also integrally comprises the shunt resistor 67.

The busbar 18 preferably has a width of 2-10 millimeters, more preferably 3-7 millimeters. The busbar 18 preferably has a thickness of 0.5-2.0 millimeters, more preferably 0.7-1.5 millimeters, wherein the width of the busbar 18 is preferably at least 2 times the thickness, preferably at least 3 times the thickness, preferably at least 4 times the thickness. The busbar 18 preferably has a length of 10-120 millimeters, more preferably 30-60 millimeters, wherein the length of the busbar 18 is preferably at least 2 times the width, preferably at least 5 times the width, preferably at least 7 times the width.

The busbar 18 preferably has cross section in the width-thickness direction of at least 1.0 $mm^2$, preferably at least 2.0 $mm^2$, preferably at least 3.0 $mm^2$, preferably at least 4.0 $mm^2$, and preferably less than 10.0 $mm^2$, preferably less than 8.0 $mm^2$, preferably less than 7.0 $mm^2$.

The busbar 18 is composed of a metal material, preferably copper or a copper alloy, or e.g., aluminum or an aluminum alloy. The resistivity of the busbar 18 is preferably in the range of 0.0080-0.025 μΩ·m.

The present teachings are particularly well suited for applications that utilize battery packs 100 containing a battery 60 having a rated voltage in the range of 10-100 volts, e.g., 18-50 volts. Such a battery 60 is also preferably capable of outputting 1-20 amperes of current, e.g., 2-15 amperes.

3. Effects

According to the first embodiment as explained above, the following effects are obtained.

(1) By providing the busbar 18 in the current discharge path between the battery negative terminal 12 and the negative-electrode tab 60b, the amount of heat transferred to the MPU 620 and the AFE 610 is reduced (as compared to embodiments that utilize copper pattern (tracks) for this electrical connection), and thereby the effect of heat on the heat-sensitive MPU 620 and the AFE 610 can be reduced. In addition, by providing the busbar 18 on the board 10, flexure of the board 10 can be curtailed, and the structure of the board 10 can be strengthened.

(2) By providing the shunt resistor 67 in the current discharge path between the battery negative terminal 12 and the negative-electrode tab 60b, heat generated by the shunt resistor 67 is transferred to the busbar 18 and dissipated from the busbar 18. Thereby, the transfer of heat generated by the shunt resistor 67 to the MPU 620 and the AFE 610 can be advantageously curtailed.

(3) Because the non-contacting part 18b of the busbar 18 does not contact the board 10, the transfer of heat from the busbar 18 to the MPU 620 and the AFE 610 can be further reduced (as compared to an embodiment in which the entire busbar 18 directly contacts the board 10).

(4) In an embodiment in which the busbar 18 is configured integrally with the shunt resistor 67, the number of parts on the board 10 can be reduced. In turn, the size of the board 10 can be reduced.

Other Embodiments

One representative embodiment for carrying out the present disclosure was explained above, but the present disclosure is not limited to the first embodiment described above, and various modifications can be implemented including, but not limited to, the following modifications.

Figure 8:
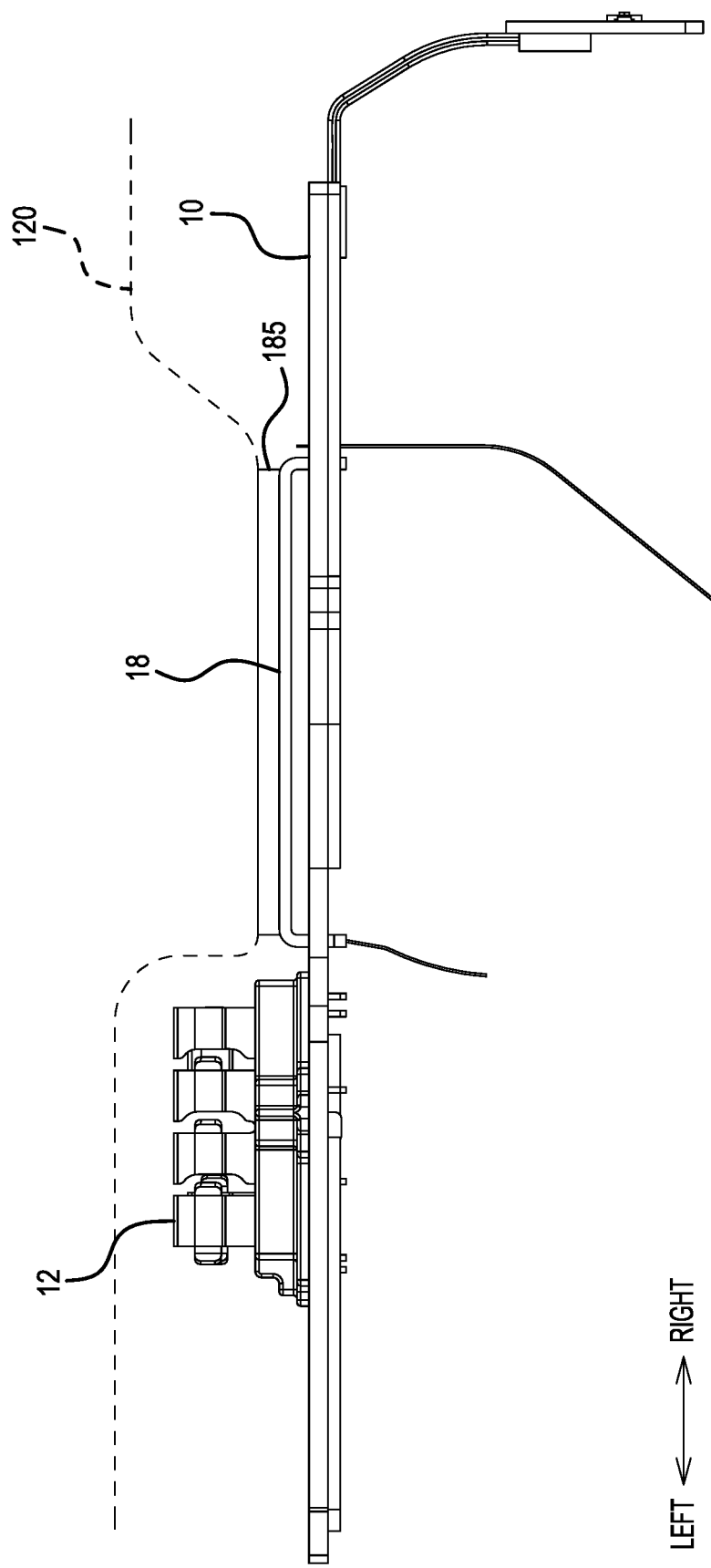
FIG. 8 is a side view of a board of a battery pack according to a second embodiment of the present teachings.

(a) In the above-described first embodiment, the second (air) gap is provided between the surface of the busbar 18 and the upper case 120, but the present disclosure is not limited thereto. As shown in FIG. 8, a thermally conductive pad (heat-dissipating sheet) 185 may be provided on the busbar 18 in a second embodiment of the present teachings. For example, the thermally conductive pad 185 may be provided such that it makes contact with both a surface of the busbar 18 and an inner surface of the upper case 120. The thermally conductive pad 185 may be mainly composed of, for example, silicone (e.g., silicone elastomer), paraffin wax or carbon fibers. An impact applied to the upper case 120 (e.g., if the battery pack 100 is dropped), can be absorbed, at least in part, by the thermally conductive pad 185 (especially in embodiments in which the thermally conductive pad 185 is elastically deformable), and thereby the propagation of impact energy (shock) to the board 10 can be curtailed. In addition, owing to the thermally conductive pad 185, the dissipation of heat from the busbar 18 (and away from heat-sensitive components) can be further promoted.

As used herein, the term "thermally conductive pad" is intended to mean a pre-formed solid member, e.g., having a rectangular shape. The thermally conductive pad (or simply "thermal pad") serves as heat-dissipating sheet that is disposed on a surface of the busbar 18 and promotes heat conduction away from the busbar 18 and away from heat-sensitive components, such as the MPU 620 or any other semiconductor chip on the board 10. The thermally conductive pad is relatively firm or solid at a room temperature but may soften at higher temperatures. The thermally conductive pad optionally may contain, e.g., silicon or paraffin, thermally conductive particles (e.g., thermally conductive ceramic particles) and flame retardant.

The thermally conductive pad preferably has a thermal conductivity of at least 0.8 W/mK according to ASTM E 1530-19, preferably at least 1.0 W/mK, preferably at least 1.5 W/mK, preferably at least 2.0 W/mK. even at least 4.0 W/mK. The thickness of the thermally conductive pad may be, e.g., in the range of 0.5-4.0 mm.

(b) In the above-described first embodiment, the various terminals, the SCP circuit 81, and the shunt resistor 67 are provided on the board 10 as devices having a resistance component, but devices having a resistance component are not limited thereto. For example, one or more field-effect transistors (hereinbelow, FET), such as a power MOSFET, may be provided on the board 10 as one or more additional devices having a resistance component. A FET may be provided to cut off the charging current or the discharge current to the positive-electrode line 101 and/or the negative-electrode line 102.

(c) In the above-described first embodiment, the busbar 18 is provided in (in series with) the negative-electrode line 102, but the busbar 18 may be provided in (in series with) the positive-electrode line 101 or busbars 18 may be respectively provided in (in series with) both the negative-electrode line 102 and the positive-electrode line 101. In accordance with the arrangement of components on the board 10, the busbar 18 may be provided along (in series with) a line (wiring) disposed near the MPU 620 and the AFE 610.

(d) A plurality of functions having a single structural element in the embodiments above may be implemented by a plurality of structural elements, and a single function having a single structural element may be implemented by a plurality of structural elements. In addition, a plurality of functions having a plurality of structural elements may be implemented by a single structural element, and a single function implemented by a plurality of structural elements may be implemented by a single structural element. In addition, a portion of the configuration of each embodiment above may be omitted. In addition, at least a portion of the configuration of each embodiment above may be supplemented or substituted by the configuration of other embodiments above.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved electric work machines, such as cordless power tools and outdoor power equipment.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Although some aspects of the present disclosure have been described in the context of a device, it is to be understood that these aspects also represent a description of a corresponding method, so that each block, part or component of a device, such as the MPU 620 or AFE 610, is also understood as a corresponding method step or as a feature of a method step. In an analogous manner, aspects which have been described in the context of or as a method step also represent a description of a corresponding block, part, detail, algorithm or feature of a corresponding device, such as the MPU 620 or AFE 610.

Depending on certain implementation requirements, exemplary embodiments of the MPU 620 of the present disclosure may be implemented in hardware and/or in software. The implementation can be configured using a digital storage medium (non-transitory computer-readable medium), for example one or more of a ROM, a PROM, an EPROM, an EEPROM or a flash memory, on which electronically readable control signals (program code—computer-readable instructions) are stored, which interact or can interact with a programmable hardware component such that the respective method is performed.

A programmable hardware component can be formed by a processor, a computer processor (CPU=central processing unit), an application-specific integrated circuit (ASIC), an integrated circuit (IC), a computer, a system-on-a-chip (SOC), a programmable logic element, or a field programmable gate array (FGPA) including a microprocessor.

The digital storage medium can therefore be machine- or computer readable. Some exemplary embodiments thus comprise a data carrier or non-transient computer readable medium which includes electronically readable control signals which are capable of interacting with a programmable computer system or a programmable hardware component such that one of the methods described herein is performed. An exemplary embodiment is thus a data carrier (or a digital storage medium or a non-transient computer-readable medium) on which the program for performing one of the methods described herein is recorded.

In general, exemplary embodiments of the present disclosure, in particular the MPU 620, are implemented as a program, firmware, computer program, or computer program product including a program, or as data, wherein the program code or the data is operative to perform one of the methods if the program runs on a processor or a programmable hardware component. The program code or the data can for example also be stored on a machine-readable carrier or data carrier. The program code or the data can be, among other things, source code, machine code, bytecode or another intermediate code.

A program according to an exemplary embodiment can implement one of the methods during its performing, for example, such that the program reads storage locations or writes one or more data elements into these storage locations, wherein switching operations or other operations are induced in transistor structures, in amplifier structures, or in other electrical, optical, magnetic components, or components based on another functional principle. Correspondingly, data, values, sensor values, or other program information can be captured, determined, or measured by reading a storage location. By reading one or more storage locations, a program can therefore capture, determine or measure sizes, values, variable, and other information, as well as cause, induce, or perform an action by writing in one or more storage locations, as well as control other apparatuses, machines, and components, and thus for example also perform complex processes in the MPU 620.

Therefore, although some aspects of the MPU 620 may have been identified as "parts" or "steps", it is understood that such parts or steps need not be physically separate or distinct electrical components, but rather may be different blocks of program code that are executed by the same hardware component, e.g., one or more microprocessors.

EXPLANATION OF THE REFERENCE NUMBERS

10 Board
11 Battery positive terminal (second connection terminal)
12 Battery negative terminal (first connection terminal)
13 Charging terminal
14 First communication terminal
15 Serial-communication terminal
16 Second communication terminal
18 Busbar
18*a* Standing part (projection)
18*b* Non-contacting part 60 Battery
60a Positive-electrode tab
60b Negative-electrode tab
67 Shunt resistor
67a First resistor
67b Second resistor
67c Third resistor
81 SCP circuit
81a First SCP circuit
81b Second SCP circuit
100 Battery pack
101 Positive-electrode line
102 Negative-electrode line
110 Battery-connection part
111 First insertion opening
112 Second insertion opening
113 Third insertion opening
114 Fourth insertion opening
120 Upper case
130 Lower case
185 Thermally conductive pad
500 Electric work machine
610 AFE
620 MPU (control circuit) ¶

The invention claimed is:

1. A battery pack comprising:
a battery;
a printed circuit board including a first surface and a second surface, the second surface being opposite to the first surface;
a first connection terminal provided on the first surface and configured to be electrically connected to an electric work machine;
a second connection terminal provided spaced apart from the first connection terminal on the first surface and electrically connected to the battery;
a control circuit provided on the board and configured to control discharging of the battery; and
a busbar included in a current discharge path between the first connection terminal and the second connection terminal, the busbar including a first standing part, a second standing part, and a non-contacting part, the first and second standing parts standing from the first surface, the non-contacting part connecting the first standing part and the second standing part, the non-contacting part being disposed above the first surface and separated from the first surface by a gap.

2. The battery pack according to claim 1, further comprising a device, which has a resistance component and is provided in the current discharge path on the printed circuit board.

3. The battery pack according to claim 1, wherein the busbar comprises a shunt resistor.

4. The battery pack according to claim 1, further comprising:
a case that houses the battery and the board; and
a thermally conductive pad provided such that it contacts both an inner surface of the case and a surface of the busbar.

5. The battery pack according to claim 4, wherein the thermally conductive pad is mainly composed of silicone, paraffin wax or carbon fibers, or has a thermal conductivity of at least 0.8 W/mK.

6. The battery pack according to claim 1, wherein the busbar:
has a width of 2-10 millimeters, a thickness of 0.5-2.0 millimeters and a cross section in the width-thickness direction of 1-10 mm$^2$, or
has a length of 10-120 millimeters, or
is composed of copper or a copper alloy, or
is electrically connected between the first connection terminal and a negative electrode of the battery.

7. The battery pack according to claim 1, wherein the battery has a rated voltage of 10-100 volts.

8. The battery pack according to claim 7, wherein the busbar has a width of 2-10 millimeters, a thickness of 0.5-2.0 millimeters and a cross section in the width-thickness direction of 1-10 mm$^2$.

9. The battery pack according to claim 8, wherein the busbar has a length of 10-120 millimeters.

10. The battery pack according to claim 9, further comprising:
a case that houses the battery and the board; and
a thermally conductive pad provided such that it contacts both an inner surface of the case and a surface of the busbar,
wherein:
the thermally conductive pad is mainly composed of silicone, paraffin wax or carbon fibers; and
the thermally conductive pad has a thermal conductivity of at least 0.8 W/mK.

11. The battery pack according to claim 10, wherein the busbar comprises a shunt resistor electrically connected to a current-detecting device.

12. The battery pack according to claim 11, wherein the busbar is electrically connected between the first connection terminal and a negative electrode of the battery.

13. A battery pack comprising:
a battery comprising at least one battery cell;
a circuit board including a first surface and a second surface, the second surface being opposite to the first surface;
a negative battery terminal provided on the first surface and configured to be electrically connected to a corresponding terminal of an electric work machine;
a negative-electrode tab provided on the first surface and electrically connected to a negative electrode of the battery;
a microprocessor provided on the circuit board and configured to control discharging of the battery; and
a busbar included in a current discharge path between the negative-electrode tab and the negative battery terminal, the busbar including a first standing part, a second standing part, and a non-contacting part, the first and second standing parts standing from the first surface, the non-contacting part connecting the first standing part and the second standing part, the non-contacting part being disposed above the first surface and separated from the first surface by a gap.

14. The battery pack according to claim 13, wherein:
the battery has a rated voltage of 10-100 volts; and
the busbar has a length of 10-120 millimeters, a width of 2-10 millimeters, a thickness of 0.5-2.0 millimeters and a cross section in the width-thickness direction of 1-10 mm$^2$.

15. The battery pack according to claim 3, wherein:
the board includes a long side and a short side; and
a longitudinal extension of the non-contacting part extends in parallel with the long side.

16. The battery pack according to claim 1, wherein the control circuit comprising a microprocessor is provided on the first surface of the board.

17. The battery pack according to claim 16, further comprising an analog front end provided on the first surface.

18. The battery pack according to claim 17, wherein:
- the printed circuit board including a long side and a short side;
- the non-contacting part has an elongated shape, the elongated shape having a direction of elongation that extends in parallel with the long side; and
- the control circuit and the analog front end are disposed between the first standing part and the second standing parts along the long side.

19. A battery pack comprising:
- a battery;
- a printed circuit board including a first surface and a second surface, the second surface being opposite to the first surface;
- a first connection terminal provided on the printed circuit board and configured to be electrically connected to an electric work machine;
- a second connection terminal provided on the printed circuit board and electrically connected to the battery;
- a control circuit comprising a microprocessor, the control circuit being provided on the first surface, and configured to control discharging of the battery; and
- a busbar included in a current discharge path between the first connection terminal and the second connection terminal, the busbar including a first standing part, a second standing part, and a non-contacting part, the first and second standing parts standing from the first surface, the non-contacting part connecting the first standing part and the second standing part, the non-contacting part being disposed above the first surface and separated from the first surface by a gap.

20. A battery pack comprising:
- a battery;
- a board including a long side and a short side;
- a first connection terminal provided on the board and configured to be electrically connected to an electric work machine;
- a second connection terminal provided on the board and electrically connected to the battery;
- a control circuit provided on the board and configured to control discharging of the battery; and
- a busbar included in a current discharge path between the first connection terminal and the second connection terminal, the busbar including a first standing part, a second standing part, and an elongated non-contacting part, the elongated non-contacting part having a direction of elongation that extends in parallel with the long side, the elongated non-contacting part connecting the first standing part and the second standing part and being disposed above the board and separated from the board by an air gap.

* * * * *